United States Patent Office 3,644,563
Patented Feb. 22, 1972

3,644,563
ETHYLENE OLIGOMERIZATION
Ronald S. Bauer, Orinda, Harold Chung, Berkeley, Peter W. Glockner, Alameda, and Wilhelm Keim, Berkeley, Calif., and Henry van Zwet, Amsterdam, Netherlands, assignors to Shell Oil Company, New York, N.Y.
No Drawing. Filed Nov. 5, 1969, Ser. No. 874,376
Int. Cl. C07c 3/10
U.S. Cl. 260—683.15 D
10 Claims

ABSTRACT OF THE DISCLOSURE

Ethylene is oligomerized to a mixture of olefinic products of high linearity in the presence of a heterogeneous catalyst comprising (a) a nickel chelate of a bidentate ligand having a tertiary organophosphorus moiety and a carboxymethyl or carboxyethyl group attached directly to the phosphorus atom of the organophosphorus moiety and (b) an inorganic siliceous oxide support.

BACKGROUND OF THE INVENTION

A variety of polymerization catalysts, both homogeneous and heterogeneous, has been utilized to convert ethylene into olefinic products of higher molecular weight, e.g., to dimer, trimer, and tetramer as well as higher oligomers and polymers. However, the character and relative proportions of the product mixture components are greatly dependent upon the particular catalyst and reaction conditions employed.

SUMMARY OF THE INVENTION

It has now been found that an improved process of oligomerizing ethylene is obtained through the use of a catalyst composition comprising (1) a nickel chelate of a bidentate chelating ligand having a tertiary organophosphorus moiety and a carboxymethyl or carboxyethyl group attached directly to the phosphorus atom of the organophosphorus moiety and (2) an inorganic siliceous oxide support. The catalyst composition is extremely active and effects rapid ethylene conversion at moderate temperature to oligomeric products which are highly linear and predominantly terminal olefins.

DESCRIPTION OF THE PREFERRED EMBODIMENT

The catalyst composition

The catalyst composition employed for the oligomerization process comprises a nickel chelate of certain tertiary organophosphorus chelating ligands supported on an inorganic siliceous oxide catalyst support.

In general, suitable inorganic solids contain a major proportion of silica and are characterized by having a relatively large surface area in relation to their mass. The term used herein and one normally used in the art to express the relationship of surface area to mass is "specific surface area." Numerically, specific surface area will be expressed as square meters per gram (m.²/g.). Generally the inorganic siliceous solid has a specific surface area of at least 100 m.²/g. and preferably the average specific surface area is from 200 m.²/g. to 800 m.²/g.

The inorganic siliceous solid is further characterized by having a surface of silanol groups, i.e., hydroxyl groups chemically bonded to surface silicon atoms, frequently known in the art as "bound water." In general, inorganic siliceous solids have a silanol concentration on the surface thereof of at least about 0.1 milliequivalent per gram, preferably at 0.5 milliequivalent per gram.

Illustrative of suitable inorganic siliceous oxides are inorganic materials known as siliceous refractory oxides. Suitable siliceous refractory oxides include synthetic products as well as acid treated clays and similar materials such as kieselguhr or crystalline macroreticular aluminosilicates known in the art as molecular sieves. In general, synthetic silicious refractory oxides are preferred over naturally occurring materials or molecular sieves, and exemplary synthetic silicious refractory catalyst supports include silica, silica-alumina, silica-magnesia, silica-alumina-titania, silica-alumina-zirconia, silica-titania-zirconia, silica-magnesia-alumina and the like. Particularly preferred synthetic inorganic silicious solids are those consisting of essentially pure silica, e.g., at least 90% silica.

The nickel chelate employed as catalyst precursor comprises an atom of nickel chelated with a chelating ligand having a tertiary organophosphorus moiety and a carboxymethyl or carboxyethyl group attached directly to the phosphorus atom of the organophosphorus moiety. The phosphorus-containing ligand generally has from 4 to 100 carbon atoms but preferably from 4 to 60 carbon atoms. A suitable class of tertiary organophosphorus chelating ligands is represented by the Formula I:

$$R_x-P(-OR)_y \quad \text{(I)}$$ 
with X above P wherein X is carboxymethyl or carboxyethyl, R is a monovalent organo group, x and y are zero, one or two and the sum of x and y is two, with the proviso that when x is two the R groups may together with the phosphorus atom form a mono- or bicyclic heterocyclic phosphine having from 5 to 7 carbon atoms in each ring thereof.

The R group is an organo group of from 1 to 20 carbon atoms, preferably of from 1 to 10 carbon atoms, and is preferably free from acetylenic unsaturation. R is therefore suitably saturated aliphatic, i.e.. acyclic saturated aliphatic as well as saturated cycloaliphatic; alkenyl, i.e., acyclic alkenyl as well as cycloalkenyl; or is aromatic, preferably mononuclear aromatic, and is a hydrocarbyl group containing only atoms of carbon and hydrogen or is substituted-hydrocarbyl group containing in addition to atoms of carbon and hydrogen other atoms such as oxygen, sulfur, nitrogen and halogen, particularly halogen of atomic number of from 9 to 53 inclusive, i.e., fluorine, chlorine, bromine, or iodine, which additional atoms are present in functional groups such as alkoxy, aryloxy, carboalkoxy, alkanoyloxy, halo, trihalomethyl, cyano, sulfonylethyl, and like groups having no active hydrogen atoms. The R groups are preferably hydrocarbyl containing only the atoms of hydrogen and carbon. Whenever the R groups contain functional groups, it is preferred that any carbon atoms attached directly to the phosphorus atom be free of functional groups, i.e., any functional groups are not substituted on a carbon atom attached directly to the phosphorus atom.

Illustrative of suitable R groups are hydrocabon alkyl R groups such as methyl, ethyl, propyl, isobutyl, lauryl, stearyl, cyclohexyl and cyclopentyl; hydrocarbon alkenyl R groups such as butenyl, hexenyl, cyclohexenyl; alkyl or alkenyl groups having aromatic substituents such as benzyl, phenylcyclohexyl and phenylbutenyl; and substituted-hydrocarbyl R groups such as 4-bromohexyl, 4-carbethoxybutyl, 3-cyanopropyl, 4-chlorocyclohexyl and 4-acetoxybutenyl. Aromatic R groups are exemplified by hydrocarbyl aromatic groups such as phenyl, tolyl, xylyl, p-ethylphenyl, and substituted-hydrocarbyl aromatic groups such as p-methoxyphenyl, m-chlorophenyl, m-trifluoromethylphenyl, p-propoxyphenyl, p-cyanophenyl, o-acetoxyphenyl and m-methylsulfonylphenyl.

Illustrative ligands of Formula I wherein x is two (i.e., ligands of the formula R₂—P—X) tertiary organophosphines such as dibutyl(carboxymethyl)phosphine, diphenyl(carboxymethyl)phosphine, di - p - chlorophenyl)-carboxymethyl)phosphine, dimethyl(2 - carboxyethyl)-phosphine, di-p-cyanophenyl-(2-carboxyethyl)phosphine, methyl(phenyl)(2-carboxyethyl)phosphine.

Illustrative ligands of Formula I wherein $y$ is two [i.e., ligands of the formula X—P—(OR)$_2$] are organophosphonous acid esters such as dipropyl carboxymethylphosphonous acid esters, diphenyl carboxymethylphosphonous acid ester, dimethyl 2-carboxyethylphosphonous acid ester, and di-p-acetoxyphenyl 2-carboxyethylphosphonous acid ester.

Illustrative ligands of Formula I wherein $x$ is one and $y$ is one (i.e., ligands of the formula

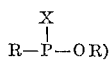

are organophosphinous acid esters such as ethyl phenyl-(carboxymethyl)phosphinous acid ester, phenyl phenyl-(carboxymethyl)phosphinous acid ester, cyclohexyl cyclohexyl(2 - carboxyethyl) - phosphinous acid ester, benzyl benzyl(carboxymethyl)phosphinous acid ester and p-acetoxyphenyl butyl(carboxymethyl)phosphinous acid ester.

Illustrative cyclic phosphines of Formula I wherein $x$ is two and the R groups are joined to form heterocyclic rings are mono-cyclic tertiary phosphines such as 5-carboxymethyl-5-phosphacyclopentane,
6-(2-carboxyethyl)-6-phosphacyclohexane,
7-(carboxymethyl)-7-phosphacycloheptane;

and bicyclic tertiary phosphines such as 8-carboxymethyl-8-phosphabicyclo(3.2.1)octane,
8-(2-carboxyethyl-8-phosphabicyclo(3.2.1)octane,
8-(carboxymethyl)-8-phosphabicyclo(2.2.2)octane,
9-carboxymethyl-9-phosphabicyclo(4.2.1)nonane,
9-carboxymethyl-9-phosphabicyclo(3.3.1)nonane and
9-(2-carboxyethyl)-9-phosphabicyclo(4.2.1)nonane.

Organophosphine ligands of Formula I ($x$ is 2) are preferred over the organophosphonous acid ester ligands of Formula I ($y$ is 2) or the organophosphinous acid ester ligands of Formula I ($y$ is 1, $x$ is 1). Particularly preferred tertiary organophosphines are those wherein both R groups are hydrocarbyl and X is carboxymethyl.

In terms of the phosphorus-containing ligands of Formula I the nickel chelate may be represented by the Formula II:

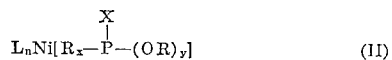

wherein R, X, $x$ and $y$ have the same significance as defined in Formula I, L is an organic complexing ligand and $n$ is one or two. It is to be understood that the nickel catalyst as depicted in Formula II represents only the empirical composition of the nickel chelate and the precise nature of the bonding between the phosphorus-containing ligand and the nickel moiety is not definitely known. However, it is considered likely that the nickel is in a low valence state, e.g., zero-valent or mono-valent nickel.

The organic complexing ligand L is any ligand other than the required phosphorus-containing ligand which organic ligand is complexed to the nickel atom so as to satisfy the coordination number of the nickel atom. In general, organic complexing ligands such as carbon monoxide, organoarsines, organostibines, organobismuthines, and like non-ionic organic ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. A particularly preferred class of olefinically unsaturated compounds are olefins of from 2 to 12 carbon atoms and represented by the Formula III:

wherein R' and R" independently is hydrogen, alkyl, cycloalkyl, alkenyl, cycloalkenyl, aralkyl, aryl or alkaryl of up to 8 carbon atoms with the proviso that the R' and R" groups may together form a divalent aliphatic moiety of from 2 to 10 carbon atoms and of up to three additional olefinic double bonds as the sole carbon-carbon unsaturation.

Illustrative olefins of Formula III therefore include ethylene, propylene, 2-butene, 1-pentene, 1-hexene, 1-octene, 1-decen, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclooctatetraene, and cyclododecatriene.

Illustrative nickel chelates of Formula II are therefore diethylene-diphenyl(carboxymethyl)phosphine-nickel,
cyclooctadiene-dibutyl(2-carboxyethyl)phosphine-nickel,
butadiene-di-p-chlorophenyl(2-hydroxyethyl)phosphine-nickel,
cyclooctadiene-diphenyl(carboxymethyl)phosphine-nickel,
cyclooctatetraene-[9-carboxymethyl-9-phosphabicyclo-(3.3.1)nonane]-nickel,
bis-2-butene-[9-(2-carboxyethyl)-9-phosphabicyclo-4.2.1)nonane]-nickel and
1,3,7-octatriene-[9-carboxymethyl-9-phosphabicyclo-(3.3.1)nonane]-nickel.

The nickel chelate employed in the oligomerization process is prepared by a variety of methods. In a preferred method, the nickel chelate is prepared by contacting an olefinic-nickel compound and the bidentate phosphine ligand. One class of suitable olefinic nickel compounds in zero-valent nickel compounds represented by the Formula IV:

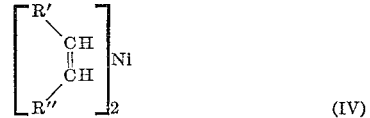

wherein R'CH=CHR" has the same significance as defined in Formula III. Illustrative nickel compounds of Formula IV are therefore bis(cyclooctadiene)nickel(0), bis(cyclooctatetraene)nickel(0), and bis(1,3,7 - octatriene)nickel(0).

Another class of suitable olefinic nickel compounds is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula V:

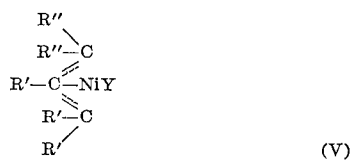

wherein R' and R" independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R" together with one R' may form a divalent alkylene moiety of 2 to 10 carbon atoms, preferably 2 to 5, and of up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula V are π-allylnickel chloride, π-allylnickel bromide, π-crotylnickel chloride, π-methylallylnickel chloride, π-ethylallylnickel chloride, π-cyclopentenylnickel bromide, π-cyclooctenylnickel chloride, π-cyclooctadienylnickel chloride, π-cinnamylnickel bromide, π-phenylallylnickel chloride, π-cyclohexenylnickel bromide, π-cyclododecenyl-nickel chloride, and π-cyclododecatrienyl-nickel chloride. Although the complex of the above Formula V and other π-allyl nickel halides probably exist independently in the form of a dimer, for convenience and simplictiy the π-allyl nickel halides are herein depicted and named as monomeric species.

Other suitable π-allyl nickel compounds of Formula V are π-allylnickel acetate, π-methylallylnickel propionate, π-cyclooctenylnickel octoate, π-allylnickel methoxyate and π-allylnickel ethoxyate.

Another suitable type of π-allyl nickel compounds useful as catalyst precursors is bis-π-allyl nickel compounds represented by the Formula VI:

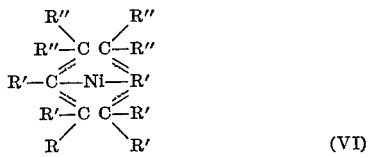

(VI)

wherein R″, R′ and the dotted line designation have the same significance as defined in Formula V, with the proviso that R″ together with one R′ of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VI are bis-π-allyl nickel, bis-π-methallyl nickel, bis-π-cinnamylnickel, bis-π-octadienylnickel, bis-π-cyclohexenylnickel, π-allyl-π-methallylnickel, and bis-π-cyclooctatrienylnickel.

The olefinic-nickel catalyst component and the phosphorus-containing ligand catalyst component are generally contacted in substantially equimolar amounts, e.g., the molar ratio of olefinic-nickel compound to the ligand varies from about 1.2:1 to 1:1.2, but is preferably about 1:1. The nickel chelate is suitably preformed by contacting the nickel chelate precursors in an inert diluent, e.g., diluents employed for the oligomerization process. In another modification, however, the nickel chelate precursor components are contacted in the presence of the inorganic siliceous solid support as described below. By any modification, the nickel chelate precursor components are contacted at temperatures from about 25° C. to 100° C.

The amount of nickel chelate to inorganic siliceous oxide support is not critical. In general, amounts of nickel chelate from about 0.01% to about 40% by weight, based on the siliceous oxide support are satisfactory, with amounts from about 0.1% to about 20% by weight, calculated on the same basis, being preferred. The nickel chelate is introduced onto the catalyst support in any suitable manner. In one modification, the supported catalyst composition is prepared by intimately contacting the preformed nickel chelate and the support in an inert diluent, preferably the same inert diluent employed for preparing the nickel chelate. In another modification, the supported catalyst can be prepared directly by contacting the nickel chelate precursor components in the presence of the catalyst support in a suitable inert diluent.

The amount of nickel catalyst employed in the oligomerization process is not critical. In general, amounts of the nickel catalyst of from 0.001% to about 100% by weight based on ethylene are satisfactory with amounts of from about 0.01% to about 25% by weight on the same basis being preferred.

The reaction conditions

The ethylene is contacted with the supported catalyst composition in the liquid phase in the absence or presence of reaction solvent or diluent which is liquid at reaction temperature and pressure. Illustrative organic solvents are aromatic compounds such as benzene, toluene, chlorobenzene and oxygenated hydrocarbons such as dialkyl ketones, e.g., acetone, methyl ethyl ketone and ethyl butyl ketone; cycloalkyl ethers, e.g., dioxane, tetrahydrofuran and tetrahydropyran; acyclic alkyl ethers, e.g., dimethoxyethane, diethylene glycol dimethyl ether and dibutyl ether. Other suitable organic solvents include nitriles such as acetonitrile and propionitrile; dialkylamides such as dimethylformamide; and dialkylsulfoxides such as dimethylsulfoxide. Alkanes and alkenes, including cycoalkanes and cycloalkenes, of from 5 to 20 carbon atoms such as butene-1, isopentane, pentene, cyclopentane, cyclohexane, isohexane, heptane, isoctane, decane, decene-1, dodecane, hexadecene and eicosane are also suitable reaction solvents. In many modifications of the polymerization process, a portion of the oligomeric product suitably serves as the reaction diluent and no added diluent is employed. When diluent is utilized, however, amounts of up to about 30 moles of diluent per mole of ethylene are satisfactory. Preferred reaction diluents and solvents are aromatic hydrocarbons, alkanes, alkenes, or mixtures thereof.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the supported catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which the supported catalyst composition is maintained. By any modification, the oligomerization process is conducted at moderate temperatures and pressures. Suitable reaction temperatures vary from about 10° C. to 250° C., but preferably from 20° C. to 100° C. The reaction is conducted at or above the atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 p.s.i.g. being preferred.

The ethylene oligomer products are materials of established utility and many are chemicals of commerce. The products are converted by conventional "Oxo" processes to aldehydes which are hydrogenated with conventional catalysts to the corresponding alcohols. Alternatively, the product olefins are converted to secondary alcohols by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

EXAMPLE I

A series of ethylene oligomerization reactions with a nickel chelate supported on several inorganic siliceous oxide supports was performed. Each supported catalyst was prepared by contacting a solution of 1.1 millimole of bis-1,5-cyclooctadienylnickel(0) and 1.1 millimole of diphenylcarboxymethylphosphine in benzene solution with 3 g. of the indicated siliceous oxide support, filtering the resulting supported catalyst and subsequently washing with additional benzene. A 3 g. sample of the supported catalyst in 25 ml. of solvent (heptane or benzene) was then contacted with ethylene supplied at a pressure of 400–600 p.s.i.g. in a stirred autoclave. The reaction conditions and results are provided in Table I.

TABLE I

| Run Number | 1 | 2 | 3 |
|---|---|---|---|
| Support: | | | |
| Composition | SiO₂ | SiO₂ | (¹) |
| Surface area, m.²/g | 600 | 700 | 500 |
| Percent weight nickel (metal) | 1.1 | 0.9 | 0.9 |
| Reaction conditions: | | | |
| Time, hours | 1 | 1 | 1 |
| Temperature, °C | 30–60 | 30–60 | 30–50 |
| Ethylene, p.s.i.g | 400–600 | 400–600 | 400–600 |
| Gram product/gram Ni/hour | 3,200 | 1,800 | 3,500 |
| Product distribution: | | | |
| Oligomers, percent weight: | | | |
| C₄–C₁₀ | 98 | 97 | 97 |
| C₁₂–C₂₀ | 2 | 3 | 3 |
| Linearity, percent | 92 | 85 | 35 |
| α-Olefin, percent | 75 | 70 | 10 |
| Polymers, percent weight | 0 | 0 | 0 |

¹ 75% weight SiO₂, 25% weight Al₂O₃.

EXAMPLE II

For comparison, a solution of 1.1 millimole of bis-1,5-cyclooctadienenickel(0) and 1.1 millimole of diphenylcarboxymethylphosphine in benzene was contacted with 3 g. samples of a variety of silica-free inorganic oxide supports by a procedure identical to that of Example I. A 3 g. sample of the supported catalyst in 25 ml. of solvent (heptane or benzene) was then contacted with ethylene supplied at 400–600 p.s.i.g. in a stirred autoclave. The silica-free inorganic oxide support employed, the reaction conditions and results are provided in Table II.

TABLE II

| Run Number | 1 | 2 | 3 | 4 |
|---|---|---|---|---|
| Support | Al₂O₃ | Al₂O₃ | MgO | ZrO₂ |
| Percent weight nickel (metal) | 0.5 | 0.5 | 0.4 | 0.5 |
| Reaction conditions: | | | | |
| Time, hours | 3 | 3 | 2 | 2 |
| Temperature, °C | 55 | 55 | 60 | 60 |
| Ethylene, p.s.i.g | 400–600 | 400–600 | 400–600 | 400–600 |
| Grams product/gram Ni/hour | 30 | 155 | 16 | 1 |
| Product distribution: | | | | |
| Oligomers, percent weight: | | | | |
| C₄–C₁₀ | 40 | 88 | 93 | 94 |
| C₁₂–C₂₀₊ | 10 | 8 | 7 | 6 |
| Linearity | 98 | 95 | 97 | 95 |
| α-Olefin | 85 | 75 | 85 | 85 |
| Polyethylene, percent weight | 50 | 4 | 0 | 0 |

EXAMPLE III

A sample of (1,5-cyclooctadiene)-[9-carboxymethyl-9-phosphabicyclo-(3.3.1)nonane 160 ml. of t-butyltoluene silica and the resulting catalyst composition is employed for the oligomerization of ethylene by a procedure similar to that of Example I. A good yield of oligomeric products is obtained.

EXAMPLE IV

A solution of 47.3 g. of chloroacetic acid in 350 ml. of benzene was mixed with a solution of 71 g. of 9-H-9-phosphabicyclo-(3.3.1)nonane 160 ml. of t-butyltoluene under an atmosphere of nitrogen. The inert nitrogen atmosphere was maintained and the resulting reaction mixture was stirred and slowly heated to reflux. After one hour under reflux (temperature 90° C.) the mixture was allowed to cool overnight during which time solid 9-H-9-carboxymethylbicyclo(3.3.1)nonyl - 9-phosphonium chloride precipitated. The solid phosphonium chloride salt was removed by filtration, washed with benzene and dried in a vacuum oven. The crude phosphonium chloride product weighed 110 g. A sample of the phosphonium chloride product was recrystallized from boiling ethanol to afford pure 9-H-9-carboxymethyl-bicyclo(3.3.1) - nonyl-9-phosphonium chloride, M.P. 303–305° C. (sealed tube). Elemental analysis of the pure phosphonium chloride salt gave the following results:

Calcd. for C₁₀H₁₈ClO₂P (percent wt.): C, 50.7; H, 7.7; Cl, 15.0; P, 13.1. Found (percent wt.): C, 50.4; H, 7.8; Cl, 14.9; P, 13.2.

A 59.2 g. sample of the crude phosphonium chloride product was dissolved in 250 ml. of 50% deaerated aqueous methanol under a nitrogen atmosphere. A solution of 42.8 ml. of 6 N sodium hydroxide was added slowly to the methanol solution. The resulting solution was then evaporated at 60° C. under reduced pressure and the residue was subsequently dried at 60° C. over phosphorus pentoxide. The residue was extracted with ether in a vapor jacketed Soxhlet extractor under an atmosphere of nitrogen. The ether extract deposited 18.1 g. of 9-carboxymethyl-9-phosphabicyclo(3.3.1)-nonane, M.P. 131–132° C. Elemental analysis of the 9-carboxymethyl-9-phosphabicyclo(3.3.1)nonane gave the following results:

Calcd. for C₁₀H₁₇O₂P (percent): C, 60.0; H, 8.6; P, 15.5. Found (percent): C, 60.0; H, 8.5; P, 15.6.

Concentration of the ether extract afforded an additional 24.5 g. of 9-carboxymethyl-9-phosphabicyclo(3.3.1) nonane.

EXAMPLE V

By a procedure similar to that of Example IV, a sample of 9 - (2 - carboxyethyl)-9-phosphabicyclo(3.3.1)nonane was prepared by (1) reaction of 3-bromopropionic acid and 9-H-9-phosphabicyclo(3.3.1)nonane to produce 9-H-9 - (2-carboxyethyl)bicyclo(3.3.1)nonyl-9-phosphonium bromide and (2) subsequently neutralizing the phosphonium bromide salt with 1 equivalent of sodium hydroxide to produce the 9 - (2 - carboxyethyl)-9-phosphabicyclo (3.3.1)nonane product.

We claim as our invention:

1. A process of oligomerizing ethylene by contacting ethylene in liquid phase at a temperature of about 10° C. to 250° C. in the presence of a heterogeneous catalyst comprising an inorganic siliceous solid containing about 0.01% by weight to about 40% by weight of a nickel complex of a chelating ligand represented by the formula

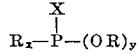

wherein X is carboxymethyl or carboxyethyl, R is a monovalent organo group of 1 to 20 carbon atoms, x is 0, 1 or 2, y is 0, 1 or 2 and the sum of x+y is 2, with the proviso that when x is two, the R groups may together with the phosphorus atom form a mono or bicyclic heterocyclic phosphine having from 5 to 7 carbon atoms in each ring thereof.

2. The process of claim 1 wherein the nickel chelate is represented by the formula

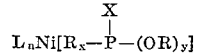

wherein R, X, x and y have the same significance as defined in claim 1, L is an olefinically unsaturated ligand and n is one or two.

3. The process of claim 1 wherein the nickel chelate is prepared by contacting in an inert diluent the ligand of the formula

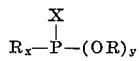

and an olefinic nickel compound of the formula

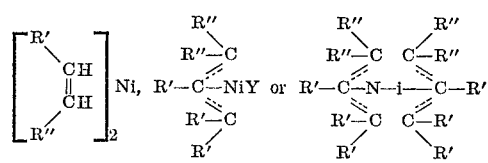

wherein R' and R" independently are hydrogen, alkyl, cycloalkyl, alkenyl, cycloalkenyl, aralkyl, aryl or alkaryl of up to 8 carbon atoms and Y is halogen of atomic number 17 to 53 inclusive, alkoxy or alkanoyloxy of up to 10 carbon atoms with the proviso that one R" together with one R' may form a divalent alkylene moiety of from 2 to 10 carbon atoms of up to three additional olefinic double bonds.

4. The process of claim 3 wherein $x$ is 2.

5. The process of claim 4 wherein the R groups of the chelating ligand are hydrocarbyl.

6. The process of claim 5 wherein X is carboxymethyl.

7. The process of claim 6 wherein the inorganic silicious oxide support has a surface area of at least 100 m.$^2$/g. and contains at least 90% by weight of silica.

8. The process of claim 7 wherein the chelating ligand is 9-carboxymethyl-9-phosphabicyclononane.

9. The process of claim 7 wherein the chelating ligand is diphenyl(carboxymethyl)phosphine.

10. The process of claim 9 wherein the olefinic-nickel compound is bis-1,5-cyclooctadienenickel(0).

References Cited
UNITED STATES PATENTS

| | | | |
|---|---|---|---|
| 3,379,706 | 4/1968 | Wilke et al. | 260—683.15 X |
| 3,485,881 | 12/1969 | Zuech | 260—683.15 |
| 3,532,765 | 10/1970 | Barnett et al. | 260—683.15 |

PAUL M. COUGHLAN, JR., Primary Examiner

U.S. Cl. X.R.

252—430, 431 P, 260—94.9 B, 439 R